(12) United States Patent
Truskalo

(10) Patent No.: US 6,208,093 B1
(45) Date of Patent: Mar. 27, 2001

(54) SELECTABLE CLAMPERS FOR AN S-SHAPING VOLTAGE OF A VIDEO DISPLAY

(75) Inventor: Walter Truskalo, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/246,281

(22) Filed: Feb. 8, 1999

(51) Int. Cl.$^7$ .................................................. G09G 1/04
(52) U.S. Cl. ........................ 315/371; 315/370; 315/408
(58) Field of Search .................................. 315/364, 370, 315/371, 399, 408, 27, 395, 411; 348/746

(56) References Cited

U.S. PATENT DOCUMENTS

| | | | |
|---|---|---|---|
| 3,349,279 | 10/1967 | Schafft | 315/27 |
| 3,767,963 | * 10/1973 | McArdle et al. | 315/27 |
| 4,019,093 | 4/1977 | Klein | 315/370 |
| 4,130,783 | 12/1978 | de Hollander | 315/370 |
| 4,232,254 | * 11/1980 | Haferl | 315/408 |
| 4,423,358 | * 12/1983 | den Hollander | 315/371 |
| 4,441,058 | * 4/1984 | Luz | 315/371 |
| 4,533,855 | 8/1985 | Willis et al. | 315/370 |
| 4,612,481 | 9/1986 | Storberg | 315/370 |
| 4,633,146 | * 12/1986 | Babcock | 315/408 |
| 4,695,774 | 9/1987 | Gent et al. | 315/408 |
| 4,707,640 | 11/1987 | Onozawa et al. | 315/408 |
| 4,761,586 | * 8/1988 | Wharton | 315/408 |
| 4,761,587 | * 8/1988 | Wharton | 315/408 |
| 5,043,637 | * 8/1991 | Gries et al. | 315/371 |
| 5,182,504 | 1/1993 | Haferl | 315/370 |
| 5,402,044 | 3/1995 | Haferl | 315/371 |
| 6,114,817 | * 9/2000 | Fernsler | 315/411 |

OTHER PUBLICATIONS

United States Patent Appln 09/130820 filed Aug. 7, 1998 (RCA 89042).

* cited by examiner

Primary Examiner—Haissa Philogene
Assistant Examiner—Hoang Nguyen
(74) Attorney, Agent, or Firm—Joseph S. Tripoli; Harvey D. Fried; Sammy S. Henig

(57) ABSTRACT

In a horizontal deflection circuit output stage of a video display monitor capable of operating at multi-scan rates, a given S-capacitor, selected from a bank of S-capacitors, provide S-correction at a corresponding range of frequencies. A resistor-capacitor-diode clamp selected from a bank of clamps is coupled to the selected S-capacitor for reducing ringing by causing critical damping. The in-circuit selected resistor-capacitor-diode clamp is selectable, in accordance with the selected horizontal deflection frequency.

4 Claims, 1 Drawing Sheet

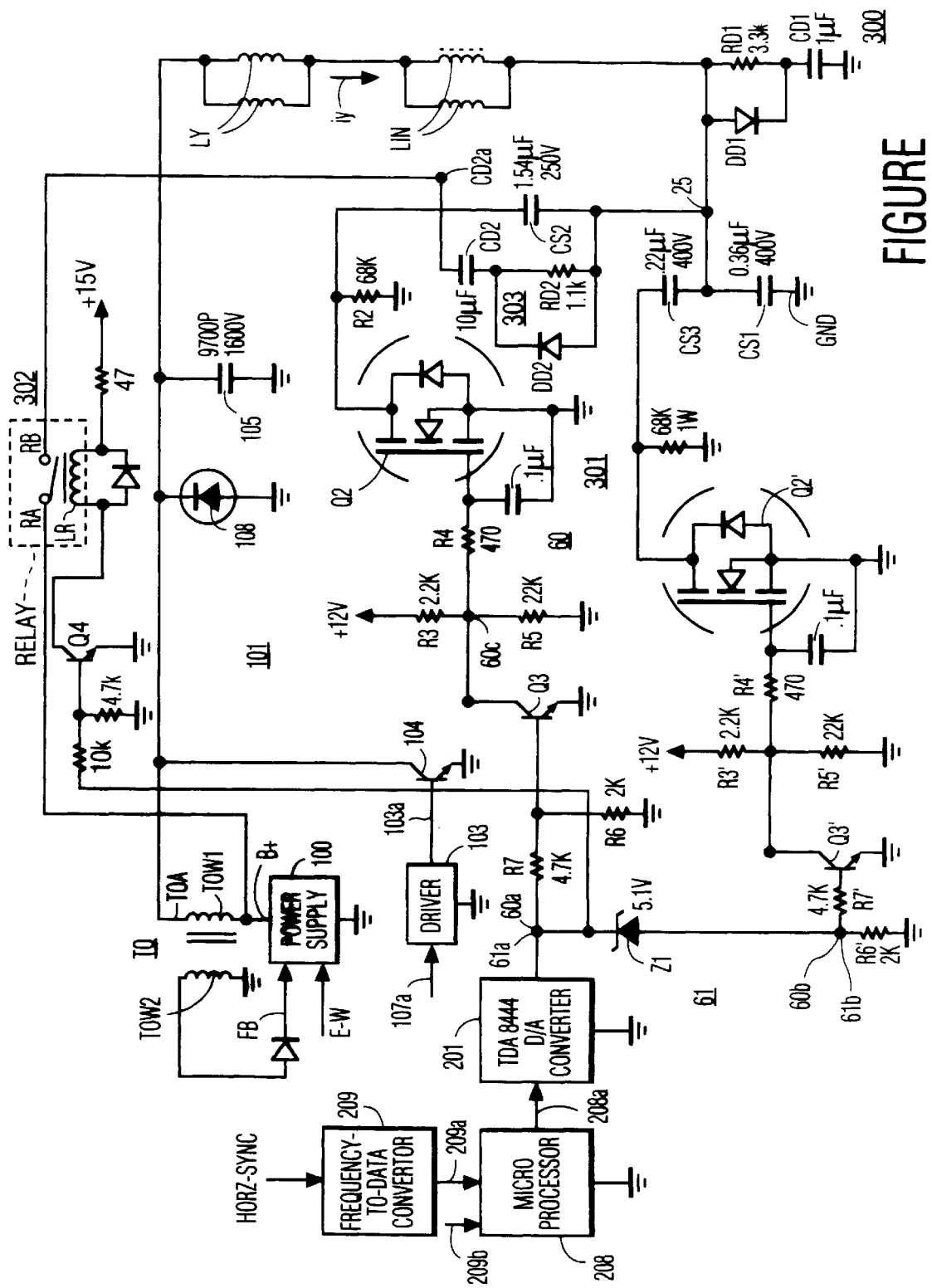
FIGURE

SELECTABLE CLAMPERS FOR AN S-SHAPING VOLTAGE OF A VIDEO DISPLAY

The invention relates to a dynamic clamping arrangement of a deflection circuit.

A television receiver, computer or monitor may have the capability of selectively displaying picture information in the same color cathode ray tube (CRT) using a deflection current at different horizontal scan frequencies. Typically, an S-capacitor is coupled to a horizontal deflection winding of a horizontal deflection circuit output stage to correct a deflection related beam landing error referred to as S correction.

A horizontal rate synchronizing signal that controls the horizontal deflection circuit may be subject to an abrupt phase change in a horizontal period that occurs, during the vertical blanking interval. Such abrupt phase change may be, for example, deliberately introduced to thwart unauthorized video recording of the video signal. Consequently, the stored energy in an inductance coupled to the supply voltage of the horizontal deflection circuit output stage may temporarily increase.

The increased stored energy is subsequently dissipated. However, disadvantageously, the return to steady state operation may be accompanied with ringing in currents and voltages produced in the horizontal deflection circuit output stage. A resistor-capacitor-diode (RCD) clamp coupled across the S-capacitance has been used to reduce such ringing by forcing the horizontal deflection circuit output stage to operate near critical damping.

When displaying the picture information of a television signal defined according to a broadcasting standard, it may be more economical to utilize a horizontal deflection current at a rate of approximately 16 KHz, referred to as the $1f_H$ rate. Whereas, when displaying the picture information of a high definition television signal or a display monitor data signal, the rate of the horizontal deflection current may be equal to or greater than 32 KHz, referred to as $2nf_H$. The value n is equal to or greater than 1.

In a horizontal deflection circuit output stage of a video display monitor capable of operating at multi-scan rates, it is known to vary the number of in-circuit S-capacitors using switched S-capacitors. The selection of the S-capacitors is made via selectable switches, in accordance with the selected horizontal deflection frequency.

In a TV receiver-monitor, which operates at the different horizontal scanning frequencies, a single RCD clamp may not be able to provide the required damping for the entire range of the horizontal scanning frequency. It may be desirable to provide the required damping for the entire frequency range.

In carrying out an inventive feature, the number of in-circuit RCD clamps varies using switched RCD clamps. The selection of the RCD clamps is made via a selectable switch, in accordance with the selected horizontal deflection frequency.

A video display deflection apparatus operating at multi-scan horizontal frequencies, embodying an inventive feature, includes a source of an input signal at a frequency related to a selected horizontal deflection frequency. A first switch, responsive to the first input signal and coupled to a horizontal deflection winding and to a retrace capacitance, is used for generating a horizontal deflection current in the horizontal deflection winding at the selected horizontal deflection frequency. The horizontal deflection winding is coupled to an S-shaping capacitance for generating an S-shaping voltage that provides horizontal linearity distortion correction. A pair of clamp circuits is selectable in accordance with the selected horizontal deflection frequency for clamping the S-shaping voltage, during a portion of a horizontal period. A second switch is responsive to the input signal and coupled to one of the clamp circuits for selecting the one clamp circuit, when the selected horizontal deflection frequency is within a first range, and for de-selecting the one clamp circuit, when the selected horizontal deflection frequency is within a second range.

The sole FIGURE illustrates a clamp, embodying an aspect of the invention, coupleds acrossed a switched S-capacitor of a horizontal deflection circuit output stage.

The sole FIGURE illustrates a horizontal deflection circuit output stage 101 of a television receiver having multi-scan frequency capability. Stage 101 is energized by a regulated power supply 100 that generates a supply voltage B+. A conventional driver stage 103 is responsive to an input signal 107a at the selected horizontal scanning frequency $nf_H$. Driver stage 103 generates a drive control signal 103a to control the switching operation in a switching transistor 104 of output stage 101. By way of example, a value of n=1 may represent the horizontal frequency of a television signal according to a given standard such as a broadcasting standard. The collector of transistor 104 is coupled to a terminal T0A of a primary winding T0W1 of a flyback transformer T0. The collector of transistor 104 is also coupled to a retrace capacitor 105. The collector of transistor 104 is additionally coupled to a horizontal deflection winding LY to form a retrace resonant circuit. The collector of transistor 104 is also coupled to a conventional damper diode 108. Winding LY is coupled in series with a linearity inductor LIN and a non-switched trace or S-capacitor CS1. Capacitor CS1 is coupled between a terminal 25 and a reference potential, or ground GND such that terminal 25 is interposed between inductor LIN and S-capacitor CS1.

Output stage 101 is capable of producing a deflection current iy. Deflection current iy has substantially the same predetermined amplitude for any selected horizontal scan frequency of signal 103a selected from a range of $2f_H$ to $2.4f_H$ and for a selected horizontal frequency of $1f_H$. The horizontal frequency of $1f_H$ is at, for example, aproximaely 16 KHz. Controlling the amplitude of deflection current iy is accomplished by automatically increasing voltage B+ when the horizontal frequency increases, and vice versa, so as to maintain constant amplitude of deflection current iy. Voltage B+ is controlled by a conventional regulated power supply 100 operating in a closed-loop configuration via a feedback winding T0W2 of transformer T0. The magnitude of voltage B+ is regulated, in accordance with a rectified, feedback flyback pulse signal FB having a magnitude that is indicative of the amplitude of current iy. A vertical rate parabola signal E-W is generated in a conventional way, not shown. Signal E-W is conventionally coupled to power supply 100 for producing a vertical rate parabola component of voltage B+ to provide for East-West distortion correction.

A switching circuit 60 is used for correcting a beam landing error such as linearity. Circuit 60 selectively couples none, only one or both of a trace capacitor CS2 and a trace capacitor CS3 in parallel with non-switched trace capacitor CS 1. The selective coupling is determined as a function of the range of frequencies from which the horizontal scan frequency is selected. In switching circuit 60, capacitor CS2 is coupled between terminal 25 and a drain electrode of a field effect transistor (FET) switch Q2. A source electrode of transistor Q2 is coupled to ground GND. A protection resistor R2 that prevents excessive voltage across transistor Q2 is coupled across transistor Q2.

A control signal 60a is generated in a digital-to-analog (D/A) converter 201. Control signal 60a is coupled via a voltage divider that includes a resistor R7 and a resistor R6 to a base electrode of a threshold determining transistor Q3. An intermediate terminal 60c disposed between a resistor R3 and a resistor R5, forming a pull-up voltage divider, is coupled to the collector of transistor Q3 and, via a protection resistor R4 to a gate electrode of transistor Q2. When control signal 60a is sufficiently large to turn on transistor Q3, the gate voltage of transistor Q2 is zero and transistor Q2 is turned off. On the other hand, when control signal 60a is not sufficiently large to turn on transistor Q3, the gate voltage of transistor Q2 is pulled up by the voltage produced via resistors R3 and R5 and transistor Q2 is turned on.

Signal 60a is coupled via a threshold determining arrangement of a zener diode Z1 coupled in series with resistor R6' to develop switch control signal 60b at a terminal 61b. Signal 60b is developed between diode Z1 and resistor R6'. Signal 60b is coupled to the base of transistor Q3' via a base resistor R7'.

In switching circuit 60, capacitor CS3 is coupled between terminal 25 and a drain electrode of a FET switch Q2'. FET switch Q2' is controlled by control signal 60b in a similar way that FET switch Q2 is controlled by control signal 60a. Thus, resistors R3', R4' and R5' and transistor Q3' are coupled to one another and perform similar functions as resistors R3, R4 and R5 and transistor Q3, respectively.

When the frequency of horizontal deflection current iy is $1f_H$, signal 60a is at a minimum level of zero volts such that the base voltage of transistor Q3 does not exceed the forward voltage of transistor Q3. Consequently, both transistors Q3 and Q3' are turned off and transistors Q2 and Q2' are turned on. The result is that both S-capacitors CS2 and CS3 are in-circuit S-capacitors that are coupled in parallel with non-switched S-capacitor CS1 and establish a maximum S-capacitance value.

When the frequency of horizontal deflection current iy is equal to or greater than $2f_H$ and less than $2.14 f_H$ signal 60a is at an intermediate level of 5V such that the base voltage of transistor Q3 exceeds the forward voltage of transistor Q3. However, the level of signal 60a does not exceed the breakdown voltage of zener diode Z1. Consequently, transistor Q3 is turned on, transistor Q3' is turned off, transistor Q2 is turned off and transistor Q2' is turned on. The result is that S-capacitor CS2 is decoupled from non-switched S-capacitor CS1 and S-capacitor CS3 is coupled to S-capacitor CS1 to establish an intermediate S-capacitance value.

When the frequency of horizontal deflection current iy is equal to or greater than $2.14 f_H$, signal 60a is at a maximum level of 10V such that the base voltage of transistor Q3 exceeds the forward voltage of transistor Q3. Also, the level of signal 60a exceeds the breakdown voltage of zener diode Z1 by a sufficient amount to produce a base voltage of transistor Q3' that exceeds the forward voltage of transistor Q3'. Consequently, transistors Q3 and Q3' are turned on and transistors Q2 and Q2' are turned off. The result is that S-capacitors CS2 and CS3 are decoupled from non-switched S-capacitor CS1 and establish a minimum S-capacitance value.

A control circuit 61 includes a microprocessor 208 that is responsive to a data signal 209a generated in a frequency-to-data signal converter 209. Signal 209a has a numerical value that is indicative of the frequency of a synchronizing signal HORZ-SYNC or deflection current iy. Converter 209 includes, for example, a counter that counts the number of clock pulses, during a given period of signal HORZ-SYNC and generates word signal 209a in accordance with the number of clock pulses that occur in the given period. Microprocessor 208 generates a control data signal 208a that is coupled to an input of D/A converter 201. The value of signal 208a is determined in accordance with the horizontal rate of signal HORZ-SYNC. D/A converter 201 generates, in accordance with data signal 208a, analog control signal 60a at a single terminal 61a. Signal 60a is at a level that is determined by signal 208a, in accordance with the frequency of signal HORZ-SYNC. Alternatively, the value of signal 208a may be determined by a signal 209b that is provided by a keyboard, not shown.

A non-switched, clamp circuit 300 includes a capacitor CD1 coupled in series with a parallel arrangement of a rectifying diode DD1 and a damping resistor RD1. Clamp circuit 300 is coupled between terminal 25 of capacitor CS1 and ground or across S-capacitor CS1. Clamp circuit 300 is an in-circuit clamp at each horizontal scan frequency of signal 103a selected from the range of $1f_H$ to $2.4f_H$. Diode DD1 of clamp circuit 300 rectifies peaks of the horizontal rate voltage component at terminal 25 of S-capacitor CS 1. The rectification occurs mainly when vertical scanning is at approximately the top third of the display screen. The R-C component values of clamp circuit 300 are selected to provide optimized damping, when the frequency of horizontal deflection current iy is equal to or greater than $2 f_H$. When the operation frequency is at the lower frequency, $1f_H$, the horizontal deflection supply voltage B+ is reduced to 70V from a higher level in the vicinity of 140V. Therefore, the rectification provided by diode DD1 of clamp circuit 300, renders a lower voltage. The result is that the power dissipated in resistor RD1 drops to about 25% of that at $2f_H$. Consequently, disadvantageouly, at the lower frequency $1f_H$ circuit 300 may not provide sufficient damping to prevent ringing.

Advantageously, a switched, clamp circuit 303 is coupled to terminal 25 and includes a capacitor CD2 coupled in series with a parallel arrangement of a rectifying diode DD2 and a damping resistor RD2. A terminal CD2a of capacitor CD2 that is remote from terminal 25 is coupled to supply voltage B+ via a relay contact RB and a relay contact RA of a relay 302. Coil LR of relay 302 is coupled between a supply voltage of 15V and the collector terminal of a relay control transistor Q4. The base terminal of transistor Q4 is coupled to terminal 61a.

When the horizontal frequency is equal or greater than $2f_H$, signal 60a at terminal 61a is at the higher level causing coil LR of relay 302 to be energized via transistor Q4. This results in decoupling contact RA from contact RB. On the other hand, when the horizontal frequency is equal to $1f_H$, signal 60a is at the lower level and causes transistor Q4 to turn off in a manner to couple capacitor CD2 to the terminal where voltage B+ is developed. Thus, clamp circuit 303 and trace capacitor CS2 are in-circuit elements when the selected horizontal scan frequency is $1f_H$.

The component values of clamp circuit 303 are selected to supplement the damping provided by circuit 300 for providing the desired damping, when the frequency of horizontal deflection current iy is equal to $1 f_H$. Advantageously, both clamp circuits 300 and circuit 303 provide together the required clamping for eliminating ringing, when the frequency of horizontal deflection current iy is equal to $1 f_H$. Similarly to capacitor CS2, clamp circuit 303 has no effect at higher frequencies than $1f_H$.

Had capacitor CD2 of clamp circuit 302 been coupled to ground as capacitor CD1, it would have differnetiated the E-W pincushion correction parabolic voltage component developed at terminal 25 of the in-circuit S-shaping capacitors. This is so because supply voltage B+ that determines the voltage at terminal 25 varies at a vertical rate parabolic manner. Such differentiation could have resulted in an undesirable sawtooth current component that varies at vertical rate in current iy of horizontal winding Ly. Disadvantageously, the undesirable sawtooth current component could have caused the sides of the raster to tilt.

Advantageously, in contrast to clamp capacitor CD 1, terminal CD2a of clamp capacitor CD2 that is remote from terminal 25 is DC coupled to supply voltage B+ via relay contacts RB and RA, instead of to ground. Each terminal of capacitor CD2 develops the same amplitude and phase of the vertical rate parabola component of voltage B+. Consequently, the voltage difference developed between the terminals of clamp capacitor CD2 excludes any vertical rate parabola voltage difference. Thus, the rectified peaks of the voltage in S-capacitor CS2, for example, and the supply voltage B+ modulation are approximately equal in magnitude. Therefore, vertical rate variations in supply voltage B+, advantageously, have no effect on the damping function.

The extent of damping required is greater when the frequency of horizontal deflection current iy is equal to 1 $f_H$, than when the frequency of horizontal deflection current iy is higher. Therefore, coupling capacitor CD1 to voltage B+ is not as important as in the case of capacitor CD2.

What is claimed is:

1. A video display deflection apparatus operating at multi-scan horizontal frequencies, comprising:

a source of an input signal at a frequency related to a selected horizontal deflection frequency;

a first switch, responsive to said input signal and coupled to a horizontal deflection winding and to a retrace capacitance, for generating a horizontal deflection current in said horizontal deflection winding at the selected horizontal deflection frequency, said horizontal deflection winding being coupled to an S-shaping capacitance for generating an S-shaping voltage that provides horizontal linearity distortion correction;

a first clamp circuit selectable in accordance with the selected horizontal deflection frequency for clamping said S-shaping voltage, during a portion of a horizontal period; and a second switch responsive to said input signal and coupled to said first clamp circuit for selecting said first clamp circuit, when the selected horizontal deflection frequency is within a first range, and for de-selecting said first clamp circuit, when the selected horizontal deflection frequency is within a second range.

2. A video display deflection apparatus according to claim 1, wherein said S-shaping capacitance comprises, a plurality of S-shaping capacitors for selecting one of said S-shaping capacitors, when the selected horizontal deflection frequency is within one of said first and second ranges, and for de-selecting said one S-shaping capacitor, when the selected horizontal deflection frequency is within the other one of said first and second ranges.

3. A video display deflection apparatus according to claim 1, further comprising a second clamp circuit for clamping said S-shaping voltage, during a portion of said horizontal period.

4. A video display deflection apparatus according to claim 3, wherein said second clamp circuit clamps both, when the selected horizontal deflection frequency is within the first range, and when the selected horizontal deflection frequency is within the second range.

\* \* \* \* \*